United States Patent [19]

Popow

[11] Patent Number: 4,497,619
[45] Date of Patent: Feb. 5, 1985

[54] CONTINUOUS MOLDING APPARATUS

[76] Inventor: Anatoliy Popow, 1810 Craig Rd., St. Louis, Mo. 63141

[21] Appl. No.: 458,787

[22] Filed: Jan. 18, 1983

[51] Int. Cl.³ .............................................. B29D 7/00
[52] U.S. Cl. .................................... 425/75; 425/115; 425/471; 264/165
[58] Field of Search .................. 264/165, 310; 425/73, 425/75, 115, 143, 471, 237

[56] References Cited

U.S. PATENT DOCUMENTS

| | | | |
|---|---|---|---|
| 2,224,430 | 12/1940 | Garbutt | 425/75 |
| 3,089,191 | 5/1963 | Conrad | 264/175 |
| 4,165,960 | 8/1979 | Lemelson | 425/145 |
| 4,191,723 | 4/1980 | Vargiu et al. | 264/175 |
| 4,204,822 | 5/1980 | Hewitt | 425/210 |
| 4,316,708 | 2/1982 | Skach et al. | 425/73 |

Primary Examiner—Donald Czaja
Assistant Examiner—V. Fischbach
Attorney, Agent, or Firm—Michael Kovac

[57] ABSTRACT

A continuous molding apparatus and method is disclosed as providing a sliding seal chamber in which moving molding surfaces form and can provide means for the induction of such temperature changes required to produce finished products from the chosen raw material.

12 Claims, 5 Drawing Figures

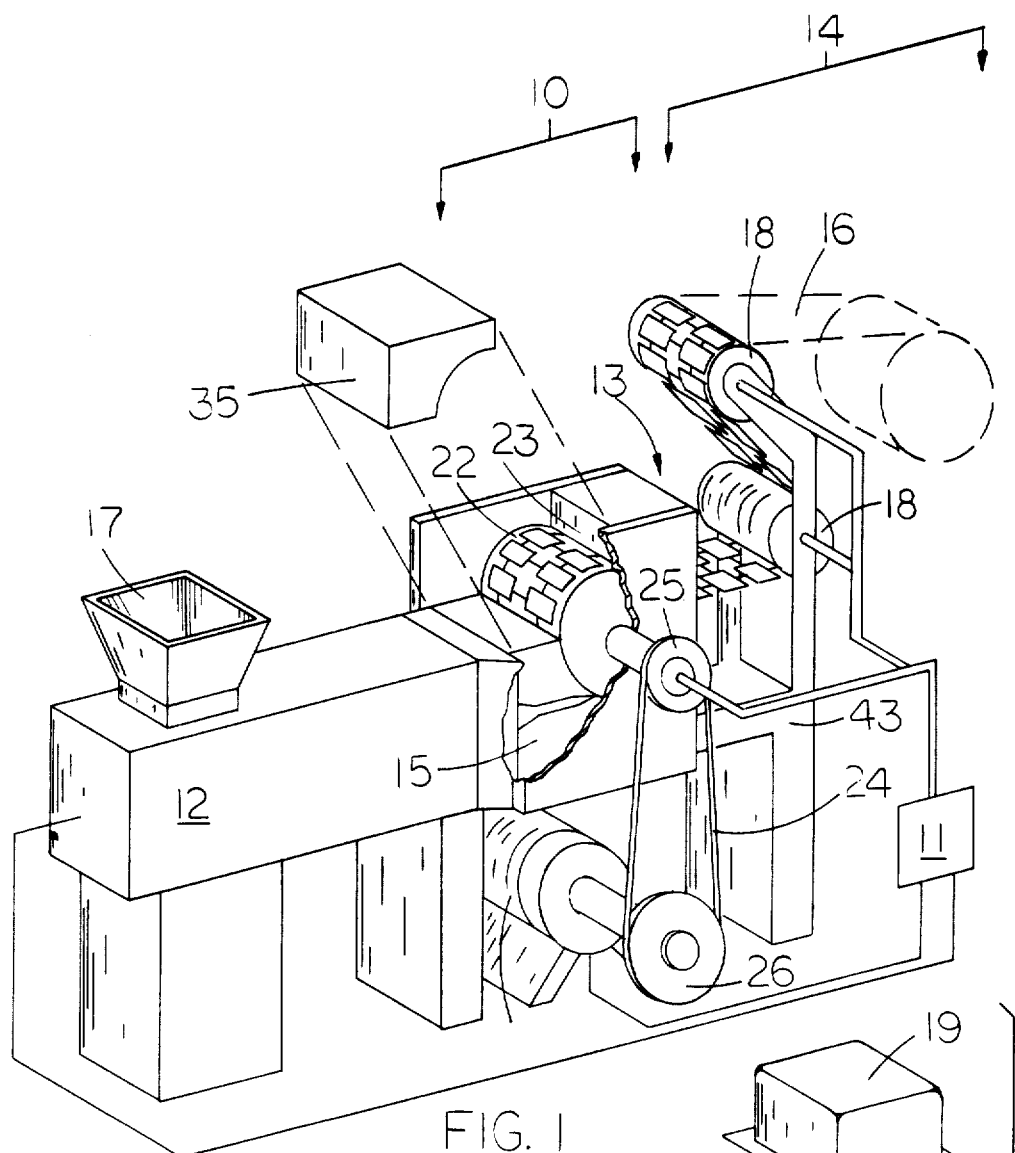
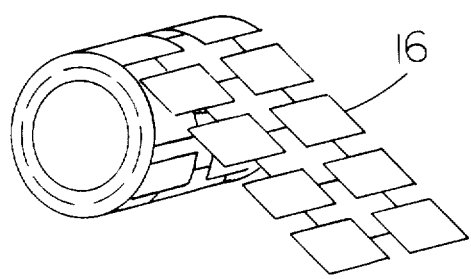
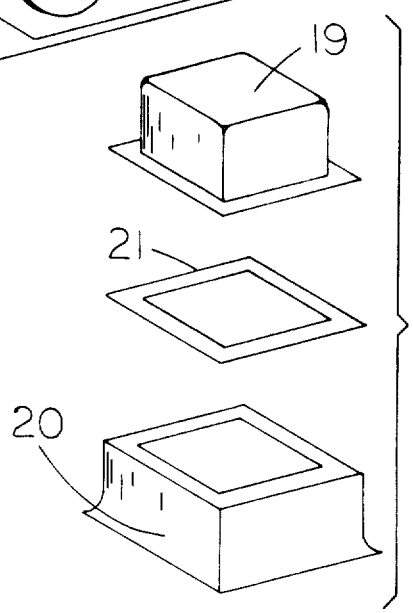
FIG. 1
FIG. 2
FIG. 3

CONTINUOUS MOLDING APPARATUS

BACKGROUND OF THE INVENTION

There are numerous well known techniques for the manufacture of molded products; however, where it may be desired for such products to be joined to one another such as an interconnected strip of plastic sealing gaskets which are joined such that they may be installed using continuous operational means, a two step process is required. First, an extruded sheet of material is produced, and then a secondary die cutting operation is performed to stamp out the selected gasket design. While the scrap from the secondary die cutting operation can be recovered and re-used in subsequent extrusion operations, this is very costly, time consuming and inefficient. Continuous molding profile techniques cannot be used alone for such a product since the processing techniques deal only with the cross-sectional shape or profile of the product to be produced. Injection molding is not possible since the molds must be opened and the product removed after each molding operation, thus making it impossible to produce an interconnected strip of molded products. Certain endless and rotary extrusion techniques have been employed for the manufacture of molded parts; however, such processes are limited in speed, product application, the variety of the product design that may be desired, and the capability to rapidly change product design configurations produced by the same general apparatus. Examples of such prior art endless and rotary extrusion processes and techniques are shown in U.S. Pat. Nos. 2,964,789; 3,121,913 and 4,165,960.

There has been a long felt need in the continuous molding art for a high speed continuous scrapless molding technique that permits production of a wide range of products without sacrificing design considerations for the product to be produced. Such products may include an interconnected strip of gaskets, industrial seals, o-rings, filter materials and various other elongated structural and sheet-like molded products which can be continously produced either connected to or separate from one another during the molding operation, as may be desired.

SUMMARY OF THE INVENTION

Accordingly, it is the primary object of the present invention to provide a continuous high speed scrapless molding process and method which permits a wide range of products to be produced.

Another object of the present invention is to provide a low cost economical apparatus and method for the continuous high speed scrapless manufacture of molded products.

Still another object of the present invention is to provide a continuous high speed scrapless technique that is simple, efficient, does not sacrifice design considerations for the products to be produced, and permits rapid change of design for molded parts to be produced from the same general apparatus.

These and other objects, advantages and potential product applications of the herein disclosed continuous molding apparatus and method will become apparent from the ensuing description.

BRIEF DESCRIPTION OF THE DRAWINGS

FIG. 1 is an isometric side view of the continuous molding apparatus which is constructed in accordance with the teachings of the present invention.

FIG. 2 is a perspective view of a roll of interconnected gaskets representative of one type of product that can be formed by the apparatus and method of the present invention.

FIG. 3 is a perspective view of a mechanical case and cover assembly showing one of the possible applications for products produced.

DESCRIPTION OF THE PREFERRED EMBODIMENTS

Figure 4:
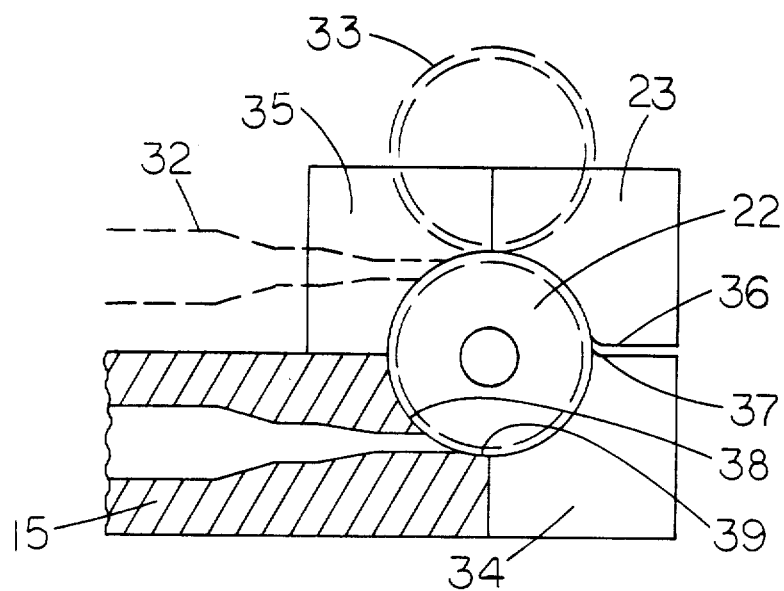
FIG. 4 is a side elevational section view of the molding head of the continuous molding apparatus.

In the description that is to follow, the continuous molding apparatus and method is described in conjunction with the production of an interconnected strip of gaskets; however it is to be understood that many different types of molded products made from many different types of materials can be produced by the herein disclosed continuous molding apparatus and method. The apparatus and method may also be applied to such product designs where a single-finished (not interconnected) product is desired.

In FIG. 1 of the drawings there is shown a continuous molding machine 10 including extruder 12, molding head 13 and a possible finished product handling system 14. The extruder component 12 may operate by any means or combination of devices for continuously feeding predetermined quantities material at any desired temperature or pressure that may be required by product design. The finished product handling system 14, if applicable, may operate by any means or combination of devices to continuously aid in handling and even assist in temperature control to provide subsequent curing of the finished product. Such temperature control and sychronized operation (with respect to the molding apparatus) of the finished product handling system 14 can be achieved by the systems control center 11 and means for a continuous flow of temperature changing medium through the finished product handling system 14. Temperature control of the raw material can be achieved by the combined operations of the systems control center 11 and temperature controlling elements contained in the nozzle 15 that connects the extruder component 12 to the molding head 13.

With the interconnected strip of gaskets 16 shown in FIGS. 1 and 2 of the drawings, the preferred molding material is polymeric and such material would be deposited in the hopper 16, and fed in a molten or liquid condition through the nozzle 15 to the molding head 13. The selection of the particular type and general compound of molding material will, of course, vary to meet the demands of the product being molded. It is believed that thermoplastic and thermosetting resins may be used, dependent upon the particular application; however, for thermosetting resins, subsequent curing may also be required. Post-molding curing may, if desired, be applied to any finished product by means of a system of one or more temperature controlled rollers 18, or devices, used in conjunction with the finished product handling system 14.

In FIG. 3, the elongated gasket product 21 is shown being applied to form a seal between a cover 19 and a case 20, as is well known.

Figure 5:
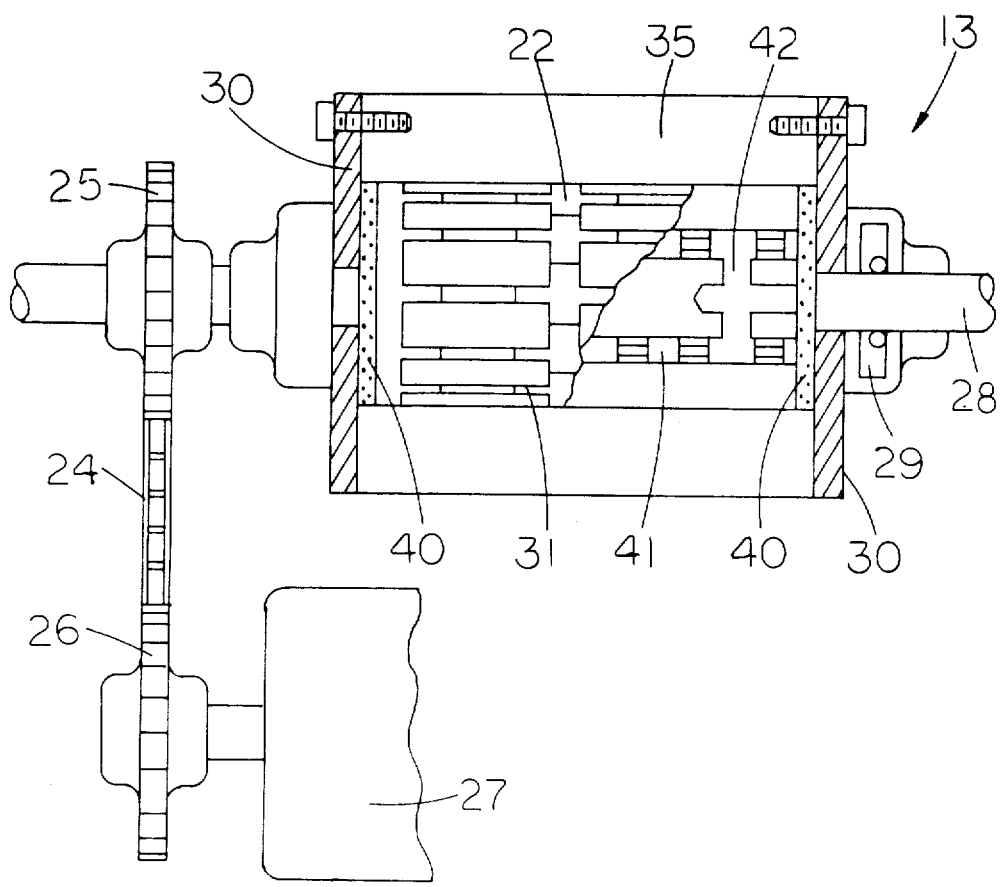
FIG. 5 is a side elevational view, partially in section, of the components and elements of the continuous molding apparatus shown in FIG. 1.

As shown in FIGS. 1, 4 and 5, the molding head 13 includes a rotary or endless molding element 22 mounted in kissing contact with the molding case. The case is comprised of three sealing chamber elements 23, 34, 35 and the material feeding nozzle 15. The shaft of the rotary molding element 22 is extended to receive a chain sprocket 25 which is connected to the corresponding chain sprocket 26 of the motor 27 by a chain 24, as shown in FIG. 5. The rotational speed of the molding element 22 may be controlled by the systems control 11 to suit the requirements of the finished product.

In order to understand the structural interrelationship and operation of the molding head 13, reference is made to FIGS. 4 and 5 of the drawings. In FIG. 5 it is seen that the shaft 28 of the molding element 22 is journaled on each end by the bearings 29. The bearings themselves are mounted on side frame members 30 which are supported by base frame members 43 as shown in FIG. 1.

The arrangement and mounting of the ends of the rotary molding element 22 relative to the side frame members 30 is such that they are each in kissing contact with sealing elements 40, 40 as shown in FIG. 5. This is important since the rotary molding element 22 is provided with the mold configuration 31 formed therein which corresponds in shape to the molded part desired. Another important reason for the kissing contact is that the raw material will be forced under pressure and confined within the mold or form configurations 31 during the rotary molding operation.

A very important feature of the present invention is that the rotary molding element 22 is surrounded by a sealed chamber means for maintaining a predetermined pressure and temperature during the molding process. More specifically, the sealed chamber means provide a sliding seal through the kissing contact between it and the rotary molding element 22 as seen in FIGS. 4 and 5. This is important so that predetermined quantities of raw material fed by the nozzle 15 into the rotary molding element 22 will be confined mechanically, atmospherically and thermally for accurate, efficient and high speed molding or forming operations.

The sealed chamber providing the sliding seal contact is shown in FIGS. 1, 4 and 5 as being represented by the semicircular sealing elements 23, 34, 35 which are mounted to the side frame members 30, 30 by screws, as shown in FIG. 5. These sealing elements 23, 34, 35 also double as the outer frame members of the molding head 13. As best seen in FIG. 4, the sealing elements 23, 34, 35 sealingly contact the rotary molding element 22 for an arc of approximatly 90 degrees in each of their respective locations. The remaining arc of the molding element 22 is sealed by the semi-circular surface of the nozzle 15. It is to be noted here that the three sealing elements 23, 34, 35 are removeable for fast easy cleaning and set-up as shown in FIG. 1. It should also be understood that arrangement of the nozzle 15 and sealing elements 23, 34, 35 in relationship to the rotary molding element 22 can be designed to present the forced raw material at any desired cross sectional point along the surface of the rotary molding element 22 as represented in FIG. 4 by the dotted line sample alternate position 32 of the nozzle 15. One may also find it necessary to add one or more additional rotary elements 33 if the product design requires more of a temperature change or possibly a second rotary element that also includes the mold configuration 31. These possibilities are best seen in FIG. 4.

In further description of the arrangement of the sealing elements 23, 34, 35 and the nozzle 15, it will be seen that the lower sealing element 34 butts up against the nozzle 15 and extends the curvilinear surface of the nozzle 15 counterclockwise approximately 90 degrees. The upper front sealing element 35 butts up against the nozzle 15 and the upper rear sealing element 23 extending the curvilinear surface of the nozzle approximately 180 degrees in a clockwise direction as shown in FIG. 4. This and any other structural arrangements may provide a molded part discharge port 36 which is laterally and circumferentially offset from the "kissing contact" areas between the sealing elements 23, 34, 35 and the rotary molding element 22. Thus, after the raw material is pressed and confined within the mold configurations 31 during the sealed and sliding molding operation, the products are ejected through the offset discharge port 36 with the marginal end surface 37 of the lower sealing element 34 possibly serving as a stripper for separating the molded product from the mold configurations 31 of the molding element 22.

In order to insure complete circumferential sliding seal contact, except at the discharge port 36, the nozzle 15 is provided with upper and lower curvilinear surfaces 38 and 39 respectively which have a complementary configuration to the upper front sealing element 35 and the lower sealing element 34, as seen in FIG. 4. The upper and lower curvilinear surfaces 38, 39 structurally cooperate with sealing elements 23, 34, 35 to provide a circumferential seal around the molding element 22 except at the molded part discharge port 36.

For a sliding sealing engagement along the end surfaces of the rotary molding element 22 there is provided end sealing elements 40, 40 at opposite ends of the rotary molding element 22. The end sealing elements 40, 40 are mounted by suitable means to the side frame members 30, 30 and have openings therein for receipt of the shaft 28 of the rotary molding element 22. It is to be noted that the one-piece end sealing elements 40, 40 sealingly contact the end surfaces of the rotary molding element 22 including the area of "kissing contact" thereof. The outer edges of the end sealing elements 40, 40 sealingly contact the curvilinear surfaces of the sealed chamber elements 23, 34, 35 and the upper and lower curvilinear surfaces 38, 39 of the nozzle 15 as is best seen in FIG. 5.

As a result of the aforementioned sliding sealing contact of the sealing chamber elements 23, 34, 35, the nozzle 15 and the end sealing elements 40, 40 with the rotary molding element 22, it is possible to force raw material from the nozzle 15 into the mold configurations 31, and accurately confine and press the molding material therewithin in the "kissing contact" area of the rotary molding element 22, while the rotary molding element 22 is maintained in a sliding contact sealed chamber to provide a controlled mechanical, atmospheric and thermal environment during the molding operation.

To assist in maintaining the desired thermal environment required for the finishing of the molded product, one (or more, if applicable) rotary molding element 22 is provided with temperature control means to facilitate curing and stripping from the mold configuration 31, thereby to enhance the speed of production. This may be provided, for example, by the axially offset and circumferentially spaced flow channels 41 which are shown as being facricated inside the rotary molding element 22 of FIG. 5. Note further that the flow channels 41 are interconnected to each other by a common linking channel area 42 which, in turn is linked to the shaft 28 of the rotary molding element 22. The shaft 28, at each end thereof, is also axially bored for connection at each end to a continuous source of such substances that will provide the desired thermal control. The appropriate rotary seals, valves, pumps and controlling devices, not shown, facilitate the operation of the thermal control means.

Various types of materials can be used for the various components of the molding apparatus to achieve the desired life, while minimizing cost and downtime. The invention is not to be limited to the types of material used, except insofar as their structural and functional design indicates.

With the aforementioned constructions and configurations, the continuous molding apparatus and method of the present invention produces accurately and efficiently molded parts without scrap at a high speed of production. A broad range of products can be produced without sacrificing design considerations. Rapid design changes to meet industry demands can be made by producing a number of rotary molding elements with different mold configurations which can be interchanged in the apparatus. The simplicity, low cost and efficient operation of the herein disclosed method and apparatus can now be fully understood and appreciated.

I claim:

1. A continuous molding apparatus comprising at least one endless molding means which is configured to the shape of the molded parts desired, means for injecting molten material to said endless molding means, means for operating said endless molding means in timed relationship with said injection means, and endless sliding and sealing means in continuous sliding and sealing contact with said endless molding means around the molded part configurations thereof for maintaining a continuous predetermined pressure, temperature, seal and confinement around the molded parts during the molding operation.

2. The molding apparatus as defined in claim 1 and including temperature controlling means associated with the endless molding means to control the temperature of products made thereby.

3. The molding apparatus as defined in claim 1 wherein said endless molding means comprises at least one rotary molding element, at least one of said rotary molding elements having configurations formed therein corresponding to the shape of the parts to be made.

4. The molding apparatus as defined in claim 3 and including temperature control means provided in at least one of said rotary molding elements to change the temperature of products made thereby.

5. The molding apparatus as defined in claim 4 wherein said temperature control means includes a plurality of axially offset and circumferentially spaced channels fabricated in at least one of said rotary molding elements, said channels being connected to a continuous source of temperature changing medium.

6. The molding apparatus as defined in claim 3 wherein the means providing sliding sealing contact with said rotary molding elements is provided throughout except at a molded part discharge port.

7. The molding apparatus defined in claim 3 wherein said means for injecting material includes a nozzle means which is mounted and configured relative to the rotary molding means so as to form part of said endless sliding and sealing means.

8. A continuous molding apparatus comprising at least one rotary molding element which is driven in timed relationship with the operation of the entire system, temperature control means provided in said at least one rotary molding element to change the temperature of products formed thereby during the molding operation, configurations formed in said at least one rotary molding element corresponding to the shape of the products to be formed thereby, and sliding seal chamber means surrounding said at least one rotary molding element and in continuous kissing contact with said at least one rotary molding element around the configurations formed therein for maintaining a continuous predetermined pressure, temperature and seal around the molded parts during the molding operation, said sliding seal chamber means contacting said at least one rotary molding element throughout except at a molded part discharge port.

9. The molding apparatus as defined in claim 8 wherein the sliding seal chamber means contacts said at least one rotary molding element along the circumferential and end surfaces thereof during the rotary operation thereof.

10. The molding apparatus as defined in claim 9 wherein the sliding seal chamber means is comprised of two or more semi cylindrical elements providing easy disassembly thereof for cleaning and set up of said molding apparatus.

11. The molding apparatus defined in claim 10 wherein said means for injecting material between rotary molding elements and sealed chamber surfaces comprises a nozzle means which is configured and arranged relative to the rotary molding element so as to be in circumferential sliding sealing contact therewith.

12. The molding apparatus as defined in claim 11 and including at least two cooperating rotary molding elements, and a common sliding seal element along the end surfaces of said at least two cooperating rotary molding elements.

* * * * *